(12) United States Patent
Cai et al.

(10) Patent No.: US 8,485,758 B2
(45) Date of Patent: Jul. 16, 2013

(54) YIELDABLE CONE BOLT AND METHOD OF MANUFACTURING SAME

(76) Inventors: Ming Cai, Sudbury (CA); Denis Champaigne, Sudbury (CA)

( * ) Notice: Subject to any disclaimer, the term of this patent is extended or adjusted under 35 U.S.C. 154(b) by 0 days.

(21) Appl. No.: 13/138,074

(22) PCT Filed: Jan. 7, 2009

(86) PCT No.: PCT/CA2009/000015
§ 371 (c)(1),
(2), (4) Date: Sep. 1, 2011

(87) PCT Pub. No.: WO2010/078639
PCT Pub. Date: Jul. 15, 2010

(65) Prior Publication Data
US 2012/0014756 A1    Jan. 19, 2012

(51) Int. Cl.
*E21D 21/00* (2006.01)
(52) U.S. Cl.
USPC ............. 405/259.5; 405/259.4; 405/259.1
(58) Field of Classification Search
USPC .......... 405/259.1, 259.4, 259.5, 259.6, 302.1, 405/302.2
See application file for complete search history.

(56) References Cited

U.S. PATENT DOCUMENTS

| | | | |
|---|---|---|---|
| 3,750,519 A | 8/1973 | Lerich | |
| 3,805,533 A * | 4/1974 | Askey et al. | 405/259.6 |
| 4,386,876 A * | 6/1983 | Dupeuble | 405/259.5 |
| 4,397,589 A * | 8/1983 | Darroussin et al. | 405/259.5 |
| 4,850,746 A * | 7/1989 | Finsterwalder et al. | 405/259.5 |
| 5,570,976 A * | 11/1996 | Fuller et al. | 405/302.2 |
| 6,390,735 B1 * | 5/2002 | Gaudreau et al. | 405/259.6 |
| 6,932,543 B2 * | 8/2005 | Kim | 405/259.1 |
| 6,986,623 B2 * | 1/2006 | Robertson, Jr. | 405/259.4 |
| 7,147,404 B2 * | 12/2006 | Spearing et al. | 405/259.5 |
| 7,465,128 B2 * | 12/2008 | Bruneau | 405/259.1 |
| 2006/0127189 A1 * | 6/2006 | Hedrick | 405/259.1 |
| 2007/0243026 A1 * | 10/2007 | Wu et al. | 405/259.6 |

FOREIGN PATENT DOCUMENTS

| | | |
|---|---|---|
| CA | 2458948 | 3/2003 |
| CA | 2510178 | 7/2004 |
| CA | 2549683 | 6/2005 |
| CA | 2506342 | 11/2006 |
| GB | 2141804 | 1/1985 |
| WO | WO 2007/062871 | 6/2007 |

* cited by examiner

*Primary Examiner* — Frederick L Lagman

(57) ABSTRACT

A mine roof support assembly for anchoring in a bore hole by means of a resin, cementitious grout which includes an elongated reinforcing tendon which extends from a proximal end portion to a distal end portion. A slip sheath formed from a heat shrunk plastic, is secured by heat shrinkage radially about the tendon. The sheath is mechanically coupled to the tendon so as to allow the desired axial sliding of the tendon relative to the sheath on the application of predetermined forces which sufficient to effect any desired yielding movement of the tendon in the bore hole. An anti-bonding agent or coating and/or anticorrosive may be interposed between the sheath and the tendon, whereby the sheath substantially encapsulates and limits the admixing of the interposed anti-bonding agent/anti-corrosive coating with the resin.

28 Claims, 8 Drawing Sheets

Fig. 8
Fig. 9
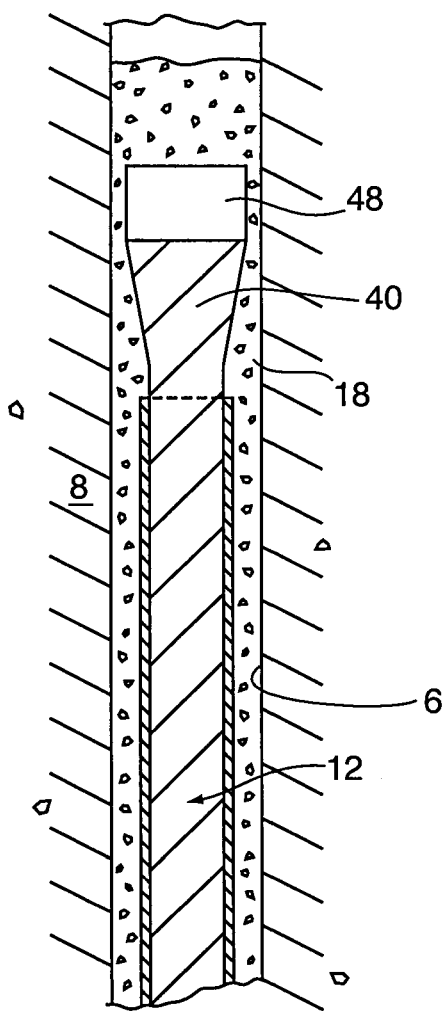
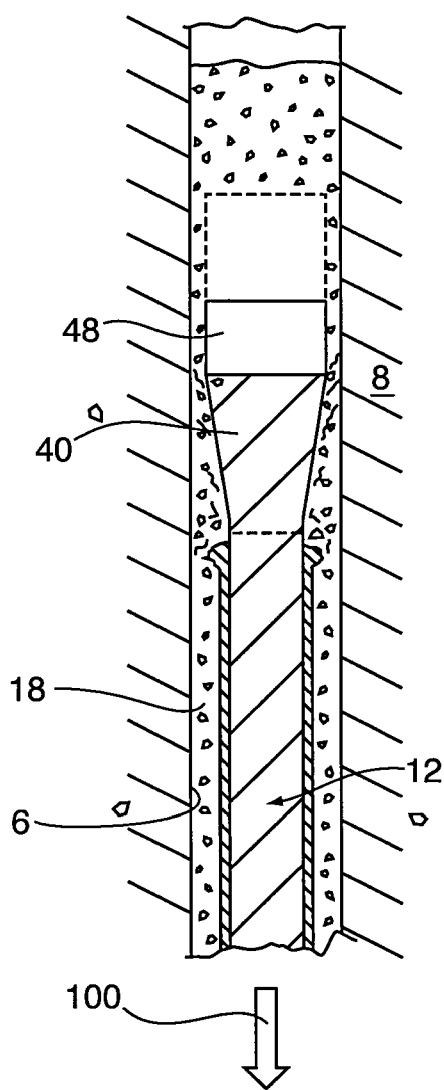

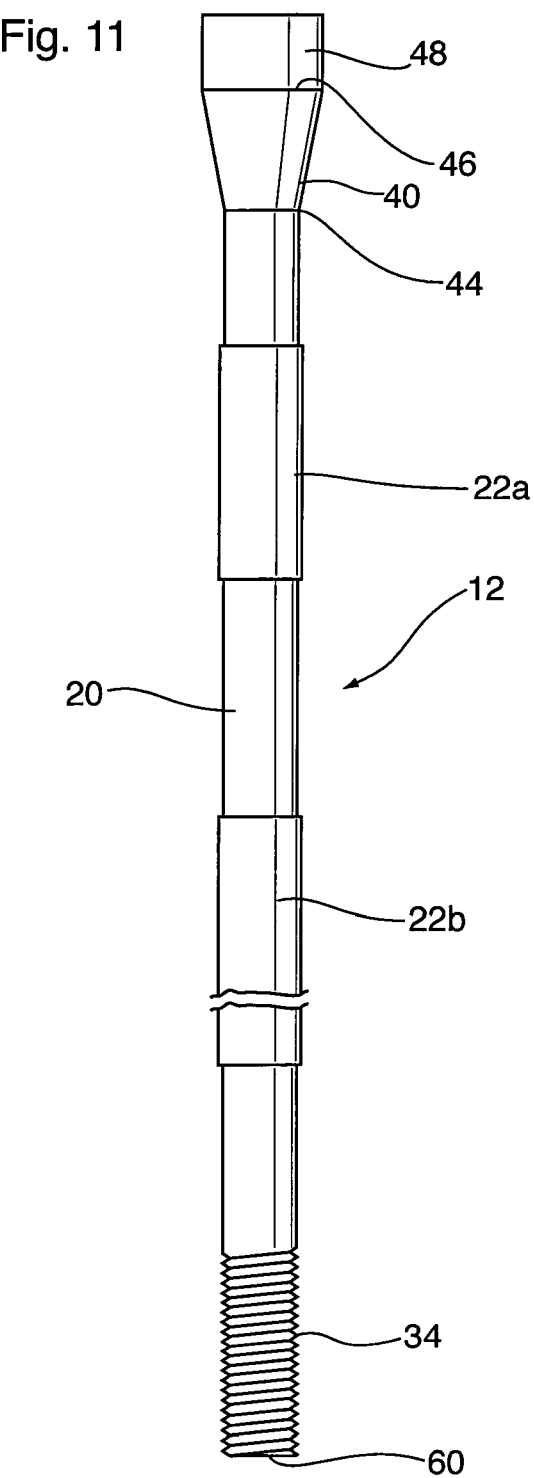

YIELDABLE CONE BOLT AND METHOD OF MANUFACTURING SAME

SCOPE OF THE INVENTION

The present invention relates to a roof and wall support system, and more particularly a mine roof support system which incorporates a grout or resin anchored yieldable cone bolt, and the method of manufacturing same.

BACKGROUND OF THE INVENTION

In ground control systems, such as mine roof, retaining wall and rock wall support systems (hereinafter collectively generally referred to as "mine roof support systems"), threaded rod-like reinforcing bolts, rebars, tendons or anchor rods are embedded into 1 to 2.5 inch diameter bore holes which are drilled into the rock complex. The rebar, bolt or anchor rods are secured in place within the bore hole by a resin or grout. Typically, the resin used to secure the reinforcing rods consists of a two-part resin which is provided in frangible cartridges sized for insertion into the bore hole immediately ahead of the rod or is pumped prior or after the bolt is installed.

Depending on the ground support type used, the reinforcing rods or bolts each vary from 2 to 30 feet in length and are made of steel and provided with a threaded outermost proximal end for installing a nut or other torquing mechanism. Other bolts may use a forged type head for installing the bolt. The thread nut and/or forged head may be used to secure a washer plate. Other bolts such as cable bolts may use a barrel and wedge type devise to apply load to the roof or wall. The bolts are positioned in the bore hole so that the threaded end projects outwardly beyond the rock face, allowing the threaded coupling of a nut thereto.

Frequently, a torquing mechanism will consist of either a dome nut, pin nut or any other torquing mechanism such as the "buddy nut", and used to rotate the bolt, to assist in the mixing of resin or grout compositions. The domed nut end cover is formed with a thickness selected so that its initial engagement with the threaded end tip of the bolt prevents further movement of the nut onto the bolt end under initial torque forces. The pin nut is installed on the bar and is secured via a roll pin or any other type of pin. The buddy nut is a nut that has a plastic cap inserted into the end of the nut that is installed through on hole the nut preventing the nut from further movement onto the threaded section. Other nut types or methods of spinning and/or torquing the bars may exist. This therefore allows the bolt to rotate together with the turning of the nut. As the resin sets, resistance to the rotation of the bolt increases to a point where the rotational forces applied to the nut, exceed a critical minimum or threshold force whereby the dome end splits or deforms, allowing the nut to be tightened along the bolt and against the rock face. Following the setting of the resin, the threaded fastener is run along to the projecting end of the bolt and tightened against the rock face to consolidate rock forces, and control ground movement. Applying a torque isn't always necessary; therefore other methods of securing a plate may be used such as a forged head or in the case of a cable bolt, a barrel and wedge cable grip or other means of securing a plate can be used.

International publication No. WO 02/02910 A2 to Gauderau, published Jan. 10, 2002 describes a yieldable cone bolt construction used as a reinforcing rod in mine roof support systems. The cone bolt described in Gauderau consists of a steel bar which has a conical wedge-shaped projection at its inner, distal-most end. The cone shape projection extends radially outwardly in a direction away from the proximal end of the bolt to a preferred maximum diameter of about 2.5 cm. A 2 to 2.5 cm long mixing tab is mounted to the end of the conical projection. The tab assists in the mixing of resins in the initial placement of the cone bolt as it is rotated. The cone bolt is constructed so that it may pullout or "yield", sliding axially in the bore hole, to effect ground control. In particular, in the event of shock or load, the cone bolt acts to counter ground forces by limited yielding, with a desired pullout strength, moving axially outwardly so as to pull the frusto-conical wedge through the harden resin and dissipate ground forces.

In the installation of yieldable mine roof support systems, it is therefore desirable to minimize any chemical adhesion between the resin and the cone bolt, which would otherwise interfere with yielding movement of the bolt. In particular, if the bolt is unable to yield, the bolt may otherwise fracture and fail completely. To minimize such adhesive contact, cone bolts are typically packaged and shipped in crates coated with grease. Immediately prior to installation, the installer uses a rag to wipe any excess grease from the surface of the cone bolt prior to its positioning within the bore hole The applicant has appreciated various disadvantages exist with the installation and use of conventional cone bolts. The packaging of cone bolts in crates immersed in grease, and the requirement to manually remove excess lubricant is both unpleasant to the installer and results in the increased possibility of contamination of both the environment and other equipment by the lubricant. This furthermore increases the chance that the bolt and/or the bolt installation tool could slip from the installer's hands, leading to damage or injury.

In addition, the application of heavy grease coatings increases the possibility that dust, dirt and other debris typically present in mining environments could adhere to the bolt prior to its insertion. Such debris may adversely contaminate the resin compositions, decreasing its effectiveness.

Furthermore, the requirement to manually removing excess lubricant from the surface of the bolt and the rotation of the bolt during resin mixing frequently produces variations in the thickness of the lubricant coating. Analytical testing has suggested that the rotation of the bolt by itself within unset resin, frequently results in the lubricating grease being stripped entirely from the bolt surface, resulting in chemical bonding between the resin and the bolt, which could interfere with yielding movement.

SUMMARY OF THE INVENTION

To at least partially overcome some of the disadvantages associated with the prior art, the present invention provides for a roof or wall support assembly for anchoring in a bore hole, and which is secured in place by a grout, cement or resin (hereinafter collectively and generally referred to as resin). The assembly includes an elongated reinforcing tendon and a slip sheath which as will be described, is coupled to the tendon. The tendon extends from a proximal end portion to a distal end portion. The sheath may be formed as a metal, rubber or graphite composite sleeve, however, most preferably is formed from a heat shrunk plastic sleeve which radially extends about at least part of the tendon.

Preferably the sheath is coupled to the tendon and allows the desired axial sliding of the tendon relative to the sheath on the application of a predetermined force which is sufficient to effect any desired yielding movement of the tendon in the bore hole. In one possible configuration, the sheath is mechanically coupled to at least part and preferably almost all of a mid-portion of the tendon intermediate of the proximal and distal ends. Although not essential, an anti-bonding agent or coating and/or anti-corrosive is interposed between the sheath and the tendon. Most preferably the sheath substantially encapsulates and limits admixing of the interposed anti-bonding agent/anti-corrosive coating with the resin.

Accordingly, an object of the invention is to provide a mine roof support system which includes a mixed resin composition, a tensionable nut, forged head, cable grip (hereinafter collectively and generally referred to as torquing or spinning mechanism) and a yieldable anchor assembly which includes a tendon provided with one or more covering sheaths used to prevent or limit chemical adhesion between the anchoring resin and the covered portions of the tendon.

An object of the invention is to provide an improved bolt which provides an effective debonding layer between the bolt and the resin, so that the cone can plough through the resin under dynamic and/or static loading without significant bolt/resin chemical adhesion or friction, and which system can also be used in other applications, as such corrosion protection of cone bolts, mechanical bolts, rebar, cable bolts, etc.

Another object of the invention is the application of the sheathing over a cable bolt which provides an effective debonding layer of the cable with either a cementations grout or resin grout (hereinafter also collectively referred to as grout). The sheathing prevents the penetration of the grout into the individual strands of the cable, thus limiting or controlling the friction pull out resistance of the cable in its entirety or portions. The debonded or reduced bonded sections may be separated to allow stiff sections versus yieldable sections as required Another object of the invention is to provide a cone bolt construction which is provided with a tendon having at least one wedge member and a covering sheath used to prevent chemical bonding and/or friction of anchoring resins to covered portions of the tendon, which would otherwise limit or restrict yielding tendon movement under dynamic and/or static loading.

Another object of the invention is to provide a cone bolt which includes a steel tendon having one or more cone-shaped or frustoconical protuberances at one end, and a heat shrunk plastic slip sheath disposed radially about at least a mid-portion of the tendon, and which allows axial sliding movement of the tendon relative to the slip sheath on the application of a predetermined force.

A further object of the invention is to provide an improved mine roof support assembly which includes a tendon having preapplied thereto, an anti-bonding and/or anti-corrosive coating which is at least partially covered a sheath to minimize coating stipping and/or contamination by dust, debris and the like.

Another object of the invention is to provide a mine roof support assembly which facilitates the simplified installation and placement of a lubricated reinforcing tendon, while minimizing inconvenience to the installer.

A further object of the invention is to provide a mine roof support system for use in mining and tunnelling applications, and which may be easily and economically manufactured, shipped and installed.

A further object of the invention is to provide a mine roof support system which incorporates a yieldable bolt, and which may be easily tuned to effect yielding movement at different preselected threshold forces, at the time of manufacture.

A further object of the invention is to provide a simplified system for manufacturing a selectively debonded bolt which is configurative to permit consistent yielding movement of the bolt.

In a most simplified construction, the present invention provides for a mine roof support assembly for use in a pre-drilled bore hole. The support system includes a longitudinally elongated steel bolt, rebar, cable bolt, cone bolt or the like (generally referred to as a tendon) which is adapted to be anchored in place by the use of a suitable anchoring resin or grout. One or more sheaths are provided radially about at least part or portions of the tendon to provide enhanced anti-corrosive properties and/or to prevent chemical bonding and/or friction between the bolt and the anchoring resin.

Preferably the present invention relates to a rock or mine roof support system applicable, for example, for ground support in rockburst conditions or yielding ground support, in which a modified cone bolt (MCB) is used for dynamic support in burst-prone grounds. In a preferred embodiment the invention provides a cone bolt which includes a cone or wedge member adapted to plough through resin to provide the necessary load carrying capacity while accommodating large deformation under dynamic loading or yielding ground conditions. Hence, it is most preferred that the bolt and the resin be debonded.

Most preferably the tendon is therefore a yieldable tendon which extends longitudinally from a threaded, forged or torquing mechanism proximal end portion to a distal-most portion having one or more wedge members or protuberances. The sheath is provided about at least part, or the entire mid-portion of the tendon which is intermediate the proximal or distal portions. In an alternative construction, the tendon may be provided with a number of longitudinally spaced sheaths, or alternately where enhanced corrosion resistance is to be achieved, substantially encapsulated by the sheath along its entire longitudinal length.

Optionally, a lubricant coating containing an anti-corrosive agent and/or anti-bonding agent is provided, interposed between the sheath and the tendon. Suitable anti-bonding agents include without restriction graphite based lubricants, petroleum based lubricants, waxes, greases and the like. In the case of yieldable cone bolts, anti-bonding agents are selected to permit axial sliding of the tendon relative to the sheath on the application of a force selected to effect yielding movement of the tendon in the stabilization of ground forces. More preferably the sheath substantially encapsulates the coatings. In this manner the coatings are maintained in isolation not only from the resin, but also from both the installer as well as mine dust and/or debris which could otherwise adhere to the cone bolt and contaminate the anchoring resins.

According to another embodiment, the slip sheath is formed from a heat shrinkable plastic tube (HSPT) such as PVC, PET, PFA. In a most simplified method of manufacture, the sheath is mechanically coupled in place by heat shrinking either a suitable rubber or plastic tube over the portions of the tendon to be covered. Preferred plastic tubes include tubes formed by heat shrinkable plastics such as polyvinyl chloride; polyvinyl acetate; polyethylene terephthalate; neoprene; and poly-apha-olefin at which have a size selected to enable their sliding placement over at least part of the tendon. Other types of plastics and/or heat shrinkable materials, such as rubbers, may also be used and will now become apparent. Once heat is applied, the tube can shrink in diameter, thus providing a tight contact with the tendon so as to mechanically couple it thereto.

The plastic sheath can be used alone or in combination with other friction reducing materials applied over the outer surface of the tendon, such as lubricants, wax or other debonding agents to enhance or control the debonding layer between the resin and the bar. Because the resin can only bond to the outer surface of the plastic sheath, the contact surface between the sheath and the steel tendon provides a perfect debonded surface which can allow the steel tendon to move with very little frictional resistance. Preferably the lubricant coating (such as oil or grease) is applied to the tendon before positioning the heat shrinkable plastic tube. The lubricant is selected to decrease the frictional resistance between the tube and the steel bar.

By controlling the debonding length of the sheath, it is possible to easily adjust the pullout strength of bolt stiffness for different ground condition/application.

Accordingly in one aspect the invention resides in a yieldable mine roof support assembly for use in a predrilled bore hole, the assembly comprising:
 a longitudinally extending tendon, said tendon being elongated along an axis and extending from a threaded proximal end portion to a distal portion, and further including a mid-portion intermediate the proximal and distal portions;
 the distal portion including at least one anchor member; and
 at least one slip sheath disposed radially about at least part of said mid-portion and being coupled thereto to allow axial sliding of said tendon relative to said sheath on the application of a predetermined force sufficient to effect yielding movement of said tendon in said bore hole.

In another aspect, the invention resides in a method of manufacturing a yieldable cone bolt for use in a predrilled bore hole, the cone bolt comprising:
 a tendon being elongated along a bolt axis from a proximal end portion to a distal end portion; and
 at least one plastic slip sheath disposed radially about at least part of said mid-portion;
 the plastic comprising a heat shrinkable plastic selected from the group consisting of polyvinyl chloride, polyvinyl acetate, polyethylene terephthalate, neoprene and poly-apha-olefin and wherein the bolt is formed by:
 selecting a tube formed of said plastic sized for sliding placement over at least one of said proximal end portion and said distal end portion;
 positioning said tube over at least part of said tendon intermediate said proximal end portion and said distal end portion; and
applying sufficient heat to said tube to shrink said plastic to form said sheath, wherein said sheath is mechanically coupled to said tendon to allow axial sliding of said tendon relative to said sheath on the application of a predetermined force sufficient to effect yielding movement of said tendon in said bore hole.

Preferably a lubricating or anti-bonding coating is applied to the tendon prior to the positioning of the plastic tube thereover. More preferably the tube is sized such that following heat shrinkage, the sheath substantially encapsulates the coating.

In another aspect the invention resides in a yieldable roof support assembly for use in a predrilled bore hole, the assembly comprising:
 an anchor member comprising a longitudinally extending steel tendon, a slip sheath, and a coating;
 said tendon extending along a tendon axis from a threaded proximal end portion to a distal portion, and further including a mid-portion intermediate the proximal and distal portions;
 the distal portion including at least one wedge member having a proximal-most reduced diameter portion and a distal-most enlarged diameter portion;
 the slip sheath disposed radially about at least part of said mid-portion and being mechanically coupled thereto to selectively allow axial sliding of said tendon relative thereto on yielding movement of said tendon in said bore hole; and
 the coating being interposed between said slip sheath and said tendon, the coating selected to provide at least one of a debonding property and an anti-corrosive property.

In a further aspect the invention resides in a mine roof support system for use in a predrilled bore hole, the system including in combination:
 an elongated cone bolt;
 a threaded fastener for tensioning said cone bolt; and
 a resin composition for securing said cone bolt at least partially in said bore hole;
 the cone bolt comprising:
 a tendon elongated along a longitudinal axis and extending from a threaded proximal end portion to a distal portion, and further including a mid-portion intermediate the proximal and distal portions;
 the threaded proximal end portion configured for threaded engagement by said threaded fastener;
 the distal portion including at least one frustoconical wedge member extending radially about the axis from a proximal-most reduced diameter portion to a distal-most enlarged diameter portion;
 a plastic slip sheath disposed radially about at least part of said mid-portion and being mechanically coupled thereto, whereby with said slip sheath engaged by said grout composition, the sheath allowing axial sliding of said tendon relative thereto on yielding movement of said tendon in said bore hole, the slip sheath having an average radial thickness selected at between about 0.4 and 20 mil; and
 a coating interposed between said slip sheath and said tendon, the coating providing at least one of a debonding property and an anti-corrosive property.

BRIEF DESCRIPTION OF THE DRAWINGS

Reference may now be had to the following detailed description taken together with the accompanying drawings in which:

FIG. 1a illustrates a cross-sectional view of a yieldable cone bolt for use with a mine roof support system, in accordance with a preferred embodiment of the invention;

FIG. 1b illustrates enlarged sectional view B shown in FIG. 1a;

FIG. 8 shows an enlarged cross-sectional view of the distal-most end portion of the cone bolt, as initially anchored in place in the bore hole following setting of resin;

FIG. 9 illustrates an enlarged cross-sectional view of the distal-most end portion of the cone bolt shown in FIG. 8, illustrating the movement of the tendon relative to the slip sheath and bore in yielding movement;

FIG. 11 illustrates a perspective view of a cone bolt in accordance with a third embodiment of the invention.

DETAILED DESCRIPTION OF THE PREFERRED EMBODIMENTS

Figure 4:
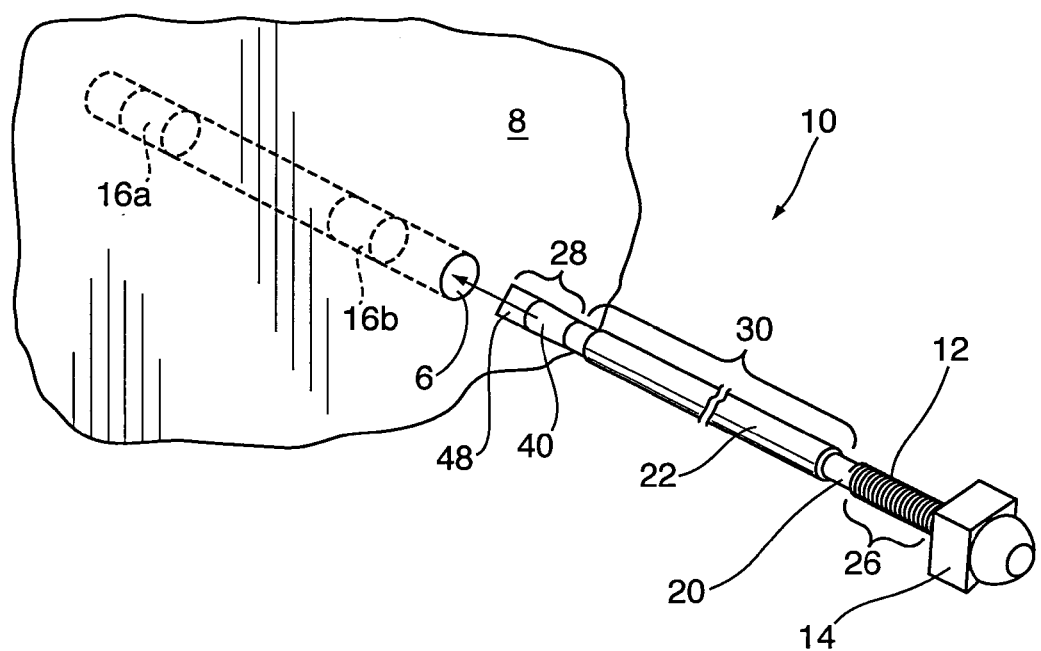
FIG. 4 shows schematically the rock complex of FIG. 3 illustrating the manner of inserting the cone bolt of FIG. 1 in the bore hole, following initial resin cartridge placement.

The present invention relates to a mine roof support assembly 10 which, as shown best in FIG. 4, is adapted for placement within a bore hole 6 formed in a rock complex 8. Depending upon the site of installation and geology, the bore hole 6 is predrilled into the rock complex 8 to a typical depth of between about 1.5 and 2 meters.

Figure 3:
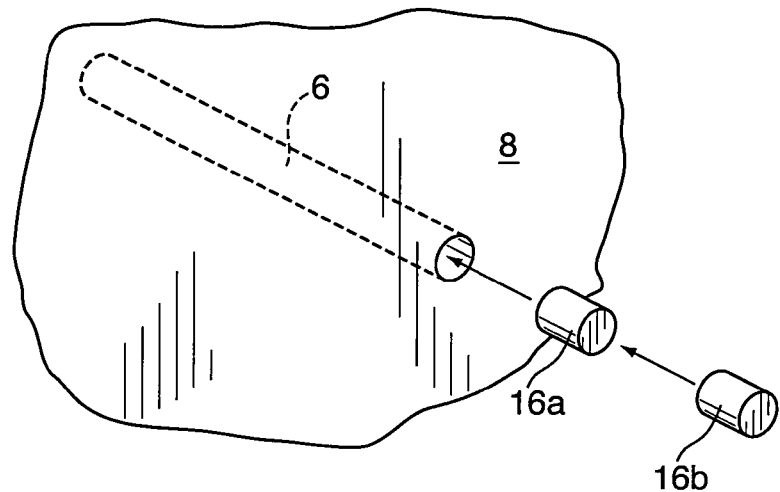
FIG. 3 shows schematically an exploded view of a predrilled bore hole formed in a rock complex, illustrating the initial placement of resin cartridges therein in the installation of a mine roof support system in accordance with the preferred embodiment.
Figure 5:
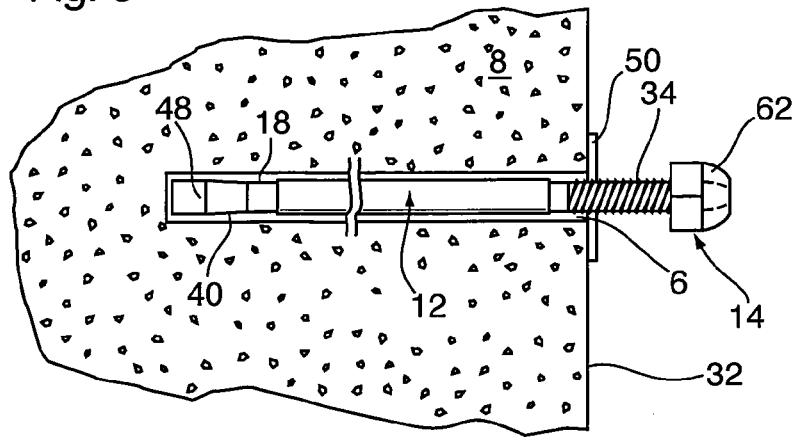
FIG. 5 shows a cross-sectional view of the rock complex of FIG. 4 illustrating the cone bolt in place, initially seated within the bore hole with a dome nut positioned thereon for initial resin mixing.

FIGS. 3 to 5 show the mine roof system 10 used to reinforce the rock complex 8 as including a cone bolt 12, a cast steel dome nut 14, and a series of two-part resin cartridges 16a, 16b which each carry a volume of unmixed two-part low viscosity resin 18 (FIG. 5). As will be described, the cone bolt 12 operates in conjunction with the dome nut 14 and resin cartridges 16a, 16b to achieve the mixing of the anchoring resin 18 within the bore hole 6, and the subsequent compression of the rock complex 8 in ground control operations.

Figure 1:
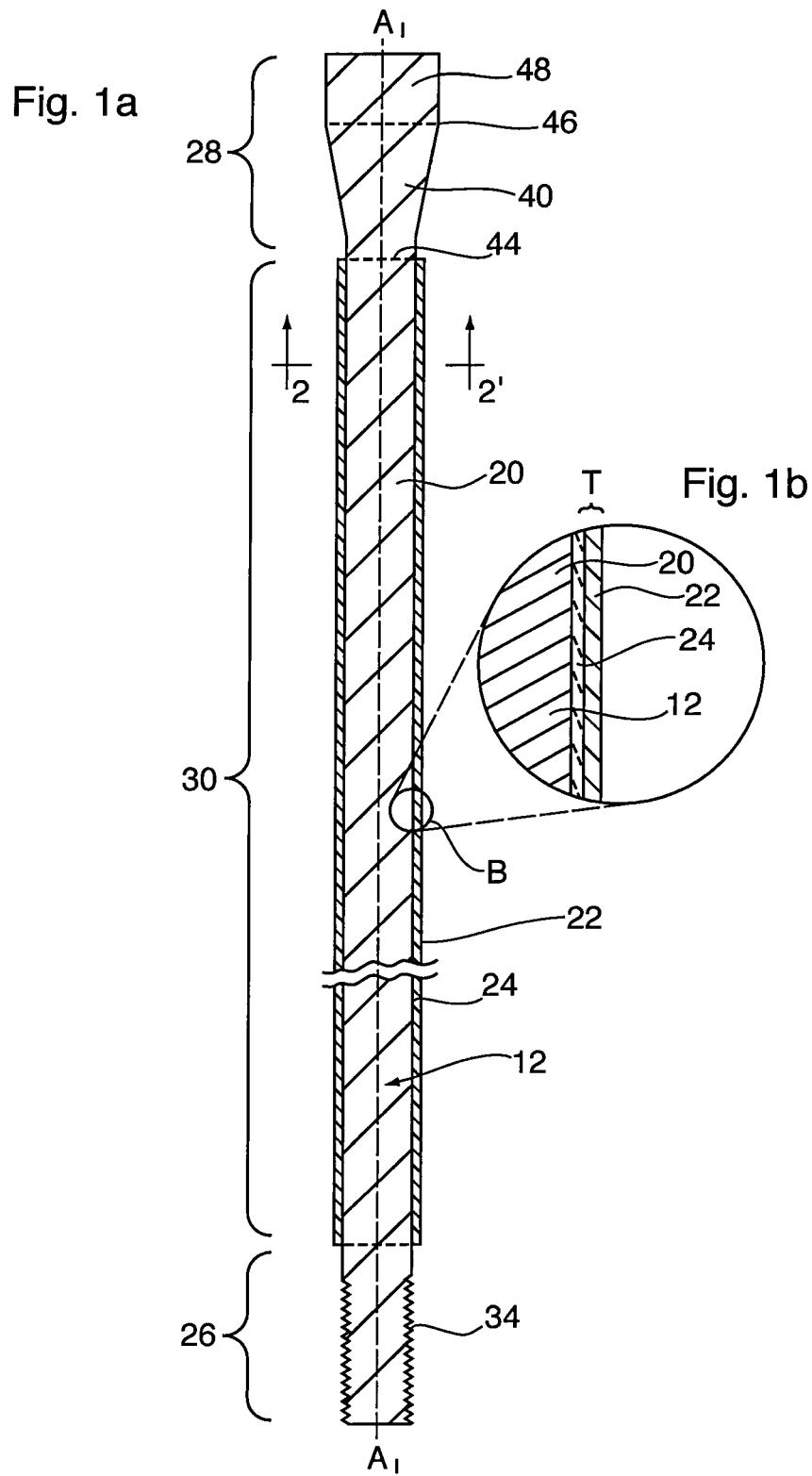
Figure 2:
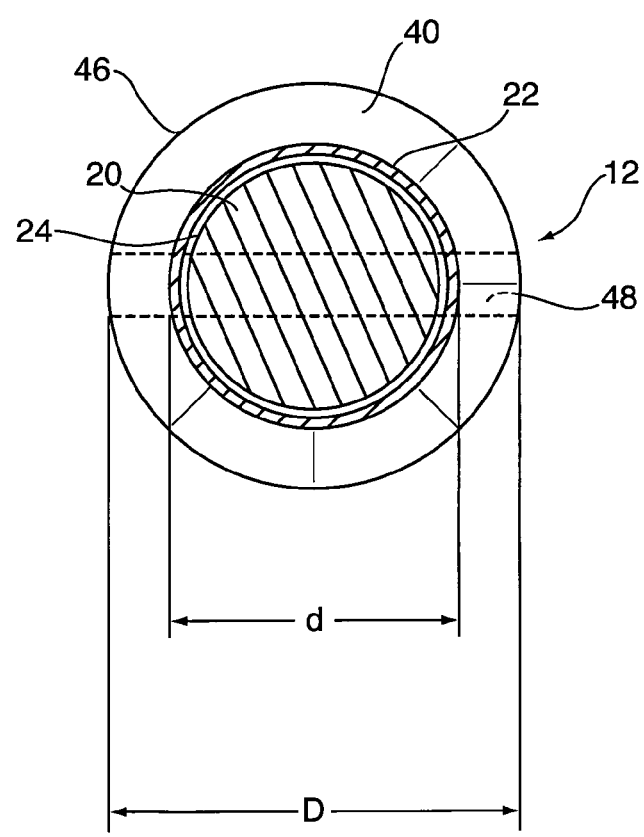
FIG. 2 illustrates a cross-sectional view of the cone bolt of FIG. 1 taken long line 2-2'.

FIGS. 1a, 1b and 2 show best the cone bolt 12 used in the mine roof support system 10. The cone bolt 12 has an overall size and diameter selected for fitted insertion within the bore hole 6 in the securement of the support assembly 10. The cone bolt 12 is elongated along a longitudinal axis $A_1$-$A_1$ having a typical overall length selected at between about 1.5 to 2.5 meters. It is appreciated that final length of the cone bolt 12 is selected having regard to the desired depth of the bore hole 6 to be drilled in the rock complex 8. As will be described, the cone bolt 12 includes an elongated steel tendon 20, a slip sheath 22 and a lubricating coating 24.

FIG. 1a shows best the tendon as extending longitudinally the axial length of the bolt 12, from an externally threaded proximal end portion 26 to a distal-most operable end portion 28. A generally smooth cylindrical mid-portion 30 joins integrally with each of the proximal and distal-most end portions 26, 28.

The tendon 20 is configured so that when the bolt 12 is fully seated in the bore hole 6 as shown in FIG. 5, the proximal end portion 26 projects a distance of between about 10 to 40 centimeters outwardly from the face 32 of the rock complex 8. Most preferably the proximal end portion 26 has an axial length of selected at between about 10 to 30 centimeters, and has formed therealong, external threads 34 which are configured for threaded mated engagement with internal threads of the dome nut 14. The mid-portion 30 of the tendon 20 is most preferably formed from 2 to 2.5 centimeter diameter solid steel cylindrical bar stock, and has an axial length of between about 1.3 and 2.4 meters.

The distal-most end portion 28 is provided with a generally frustoconically shaped wedge member 40. The wedge member 40 extends radially outwardly about the axis $A_1$-$A_1$ from a proximal-most reduced diameter end 44 which merges with the mid-portion 30, to an enlarged diameter distal end 46. Although not essential, most preferably the wedge member 40 tapers radially outwardly from the axis $A_1$-$A_1$ to the distal end 46 and at an angle of between about 3 and 15°, and preferably about 7 to 10°. The distal end 46 preferably is formed with a diameter D (FIG. 2) of at least 0.5 cm and more preferably between about 0.8 to 2 cm larger than the cross-sectional diameter d of the slip sheath 22. A blade-like tongue member 48 extends axially from the distal end 46 of the wedge member 40. The tongue member 48 has a size and shape selected to facilitate mixing of resin 18 as the bolt 12 is rotated about its axis $A_1$-$A_1$ in the bore hole 6. While FIG. 2 shows a cone bolt 12 having a single frustoconical wedge member 40 it is to be appreciated that the distal-most operational end 28 could include multiple wedge members and/or wedge members of differing configurations.

The slip sheath 22 extends radially about and encases the mid-portion 30 of the tendon 20. FIGS. 1a and 2 show best the slip sheath 22 as being elongated longitudinally along the bolt axis $A_1$-$A_1$ extending substantially the entire length of the mid-portion 30. Most preferably the slip sheath 22 is formed as a heat shrunk plastic tube or sleeve which encases and tightly grips the mid-portion 30. The sheath 22 has an average radial thickness selected at between about 0.4 and 20 mil, preferably 0.5 and 8 mil, and most preferably about 1 mil. Thicker or thinner slip sheaths 22 may however be used. The slip sheath 22 is mechanically coupled to the tendon 20 in position over the mid-portion 30 with a sufficient mechanical force selected to allow axial sliding of the tendon 20 relative to the sheath 22 on the application of a predetermined minimum force, selected to effect yielding movement of the tendon 20 in ground control applications. The heat shrinkable plastic used to form the sheath 22 is preferably a polyvinyl chloride, polyvinyl acetate, polyethylene terephthalate, neoprene, a tetrafluoroethylene or a poly-apha-olefin.

As shown best in FIG. 1b the lubricating coating 24 is interposed between the tendon 20 and the slip sheath 22, so as to be substantially encapsulated by the sheath 22 along the entirety of the mid-portion 30. The coating 24 most preferably includes both anti-corrosion and debonding agents. Suitable debonding agents would include graphite based lubricants, petroleum based lubricants and/or waxes. Anti-corrosion agents would include rust inhibitors. In a most simplified construction, the coating 24 is a 90 grade heavy oil which advantageously provides both anti-corrosive and anti-bonding properties. The coating 24 may further be provided over the entirety of the proximal and/or distal-most end portions 26, 28 of the tendon 20 where enhanced anti-corrosive properties are of interest.

The applicant has appreciated that with the present invention, following initial placement of the cone bolt 12 in the bore hole 6, the sheath 22 advantageously reduces the points of chemical adherence between the set resin 18 and the steel tendon 20 which otherwise could adversely affect the desired yielding tendon. In addition, because the coating 24 is substantially covered by the sheath 22, there is no requirement for an installer to remove excess grease or otherwise pre-prepare the tendon 20 prior to its insertion within the bore hole 6. The presence of the sheath 22 advantageously minimizes any significant stripping and admixing of the coating 24 with the resin 18 as the bolt 12 is spun during resin mixing. The use of the slip sheath 22 provides a further advantage in that it ensures that there is no significant loss in anti-corrosive coating upon the contact of the bolt 12 with acidic ground waters and the like.

Sample testing shows that the heat shrinkable sheath 22 and coating 24 may advantageously reduce the peak bonding strength between the bolt 12 and the resin 18 to a maximum of 75%, as contrasted to residual frictional resistance of only about 10% of the peak frictional resistance for undebonded rockbolts. The results furthermore may be consistently replicated with very little variability. The tightening of the bolt 12 can therefore force the debonded mid-portion 30 of the bolt 12 into its residual bonding strength state, rendering the actual bonding strength very low. At this level of low bonding strength, for practical purposes the bolt 12 can be said to be "fully" debonded from the resin 18.

The applicant has further appreciated that the present invention advantageously allows the cone bolt 12 to be easily "tuned", while enabling the use of otherwise stock or standard tendon 20 sizes. For example, if higher minimum pullout strengths are of interest, it is possible to use lubricating coatings 24 selected from lighter oils, which otherwise would be susceptible to increased stripping by resin 18 contact. In addition, only selected parts of the mid-portion 30 bolt 12 may be provided with the lubricating coating 24 as the sheath 22 advantageously acts to maintain the lubricant 24 in situ once applied.

The present invention furthermore allows for greater flexibility and control in the types of coatings 24. As the coating 24 is maintained substantially in isolation from the resin 18 by the covering sheath 22, coatings 24 which may otherwise react with the resin composition may now be used. The use of the slip sheath 22 thus permits the enhanced ability to tailor cone bolts 12 and specifically select which forces will be required to affect yielding movement at a particular location or site.

By providing the slip sheath 22 with a unique colour coding correlated to the pullout strength, as determined by the size or positioning of the slip sheath 22 and/or the type and degree of lubricating coating 24 used, an installer and/or engineer may visually determine the pullout strength of an entire section of reinforced rock complex 8. The present invention therefore allows for the overall simplified customization of rock support systems, allowing areas to be individually tuned over each section of different strata and/or the different depth of bolt placement.

The invention also achieves enhanced rust protection for the bolts 12. Rusting of rockbolts is a great concern for long-term support in underground mines. The heat shrinkable plastic sheath 22 provides secondary corrosion protection by itself, and in addition to its use with oil or grease based coatings 24. As will be described, the tendon 20 can be furthermore fully encapsulated by the heat shrinkable plastic tube for still enhanced corrosion protection.

In manufacture of the cone bolt 12 of FIG. 2, the steel tendon 20 is formed in a conventional manner by tapping the proximal end portion 26 of a length of cylindrical steel stock, and welding the frustoconical wedge member 40 to the distal end thereof.

Following formation, the tendon 20 is spray or dip coated with the suitable lubricant coating 24 over its entire axial length. Any excess coating 24 is allowed to run off, to provide the coating 24 with a substantially uniform thickness which is most selected at of between about 0.1 and 10 mil, depending on the final pullout strength desired.

Following coating, a preformed tube of heat shrinkable plastic is slid longitudinally over the tendon 20 and aligned with mid-portion 30. The plastic tube is selected with a diameter chosen to allow its positioning over the portion of the tendon 20 to be covered, and which following the application of heat, shrinks to a reduced diameter selected to mechanically couple the formed shrunken plastic sheath 22 to the tendon 20. Preferably the tube diameter is selected such that following heat shrinking, the sheath 22 mechanically engages the mid-portion 30 so as to rotate therewith during mixing of unset resin 18, while allowing the axial sliding of the tendon 20 relative to the sheath 22 on the application of the predetermined force necessary to trigger yielding tendon 20 movement.

In installation of the cone bolt 12, the bore hole 6 is drilled to the desired depth in the rock complex 8. Thereafter, a series of resin cartridges 16a, 16b, such as those sold by DuPont under the trade-mark CONELOCK™, are inserted into the bore hole 6. Immediately following the placement of the cartridges 16a, 16b, the distal end portion 28 of the tendon 20 is slid axially into the bore hole 6, such that the tongue member 48 ruptures the cartridges 16a, 16b and provide preliminary resin mixing.

Figure 6:
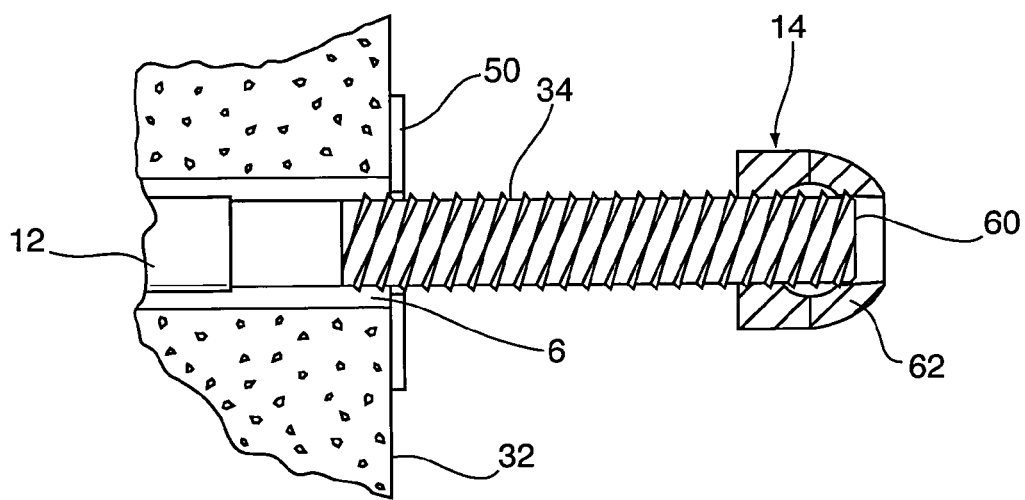
FIG. 6 shows a cross-sectional view of the proximal end portion of the cone bolt and dome nut shown in FIG. 5.
Figure 7:
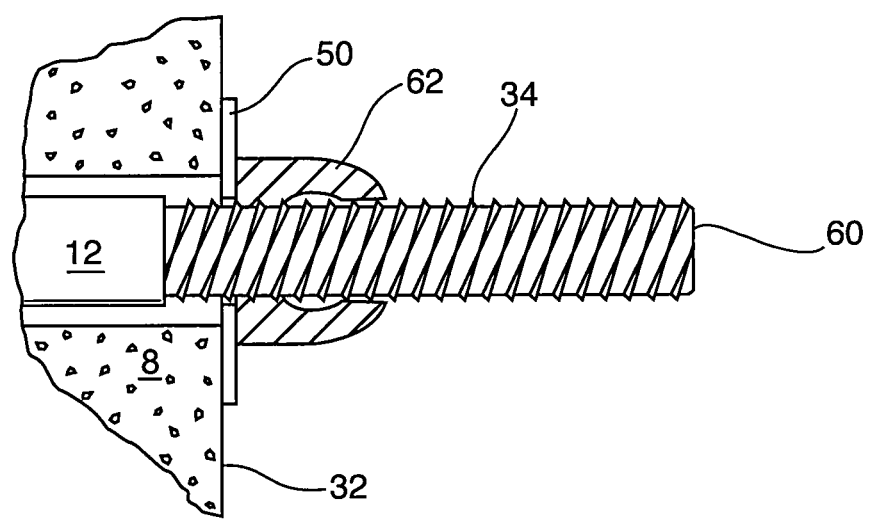
FIG. 7 shows a cross-sectional view of the proximal end portion of the cone bolt of FIG. 6 with the dome nut tightened against the rock face.

A steel reinforcing plate 50 (FIG. 6) is optionally positioned over the proximal-most end 26 of the tendon 20, and the dome nut 14 is threaded on to the proximal end tip 60 of the bolt 12, and into threaded engagement with the exterior threads 34. The dome nut 14 is advanced along the threads 34 so that the end tip 60 is moved into a seated position against the interior of the domed end cover 62 as shown in FIG. 6. The nut 14 is then rotated to effect the rotation of the bolt 12 about its axis $A_1$-$A_1$ to assist in further resin mixing.

To enhance mixing of the unset resin 18, the cone bolt 12 is rotated about its longitudinal axis $A_1$-$A_1$ by driving the dome nut 14 in rotation by a socket drive or power wrench (not shown). Initially the nut 14 is rotated in the unset resin 18 with a torque force is selected less than a predetermined minimum threshold torque required to deform the dome nut cover 62. Following mixing of the resin 18, rotation of the nut 14 is stopped and the resin 18 is permitted to set, securing the bolt 12 against further rotational movement. It is to be appreciated any chemical adhesion between the resin 18 and the bolt 12 primarily occurs between the resin 18 and the slip sheath 22. As such, with the present invention the resin 18 does not significantly adhere to the metal tendon 20 itself, where it may otherwise affect tendon pullout strength.

As shown best in FIGS. 8 and 9, in the event that ground forces exceed a predetermined minimum threshold force, the tendon 20 will tend to pullout. As the tendon 20 slides outwardly from the bore hole 6 (arrow 100), the wedge member 40 ploughs through the set resin 18, moving relative to the sheath 22 in yielding movement. It is to be appreciated that because of the comparatively smaller radial thickness T of the plastic slip sheath 22, the sheath 22 does not substantially interfere the movement of the wedge member 40 or tendon 20 in the dissipation of rock forces.

Figure 10:
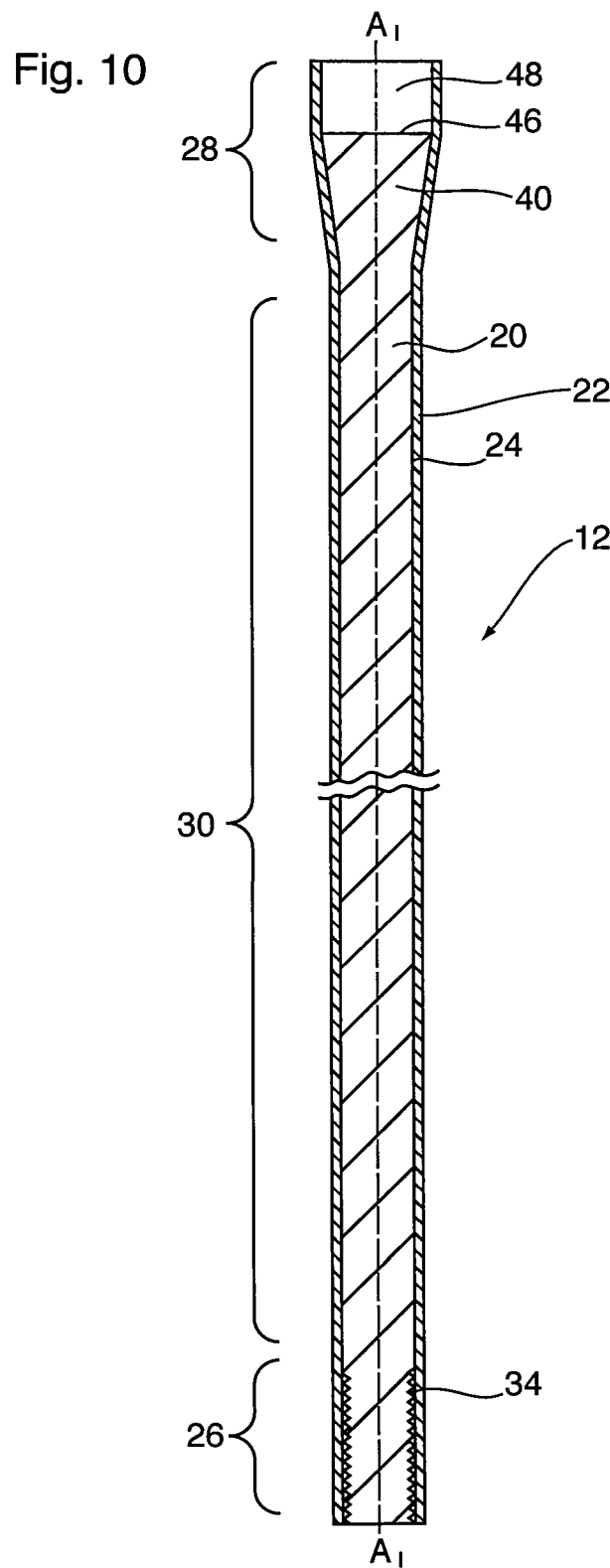
FIG. 10 illustrates a schematic cross-sectional view of a cone bolt in accordance with a second embodiment of the invention.

Although FIG. 1a illustrates the slip sheath 22 as extending longitudinal the entire length of the mid-portion 30 of the tendon 20, the invention is not so limited. Reference may be had to FIGS. 10 and 11 which illustrate cone bolts 12 in accordance with further embodiments of the invention, in which like reference numerals are used to identify like components. In FIG. 10, the sheath 22 extends the entire axial length of the cone bolt 12. In this construction, the sheath 22 substantially encapsulates the entire axial length of the tendon 20, extending not only over the mid-portion 30, but also the proximal end portion 26 and the distal-most end portion 28.

The construction shown in FIG. 10 advantageously provides the cone bolt 12 with enhanced corrosive resistant properties, and facilitates ease of handling. This is particularly advantageous where the cone bolt 12 is to be used in areas of acidic ground water, and for example, where exposed metal portions of the tendon 20 may be subject to more rapid corrosion fatigue.

Furthermore, because the sheath 22 is provided with a comparatively thin radial thickness of about 1 mil, the sheath 22 does not substantially interfere the movement of the dome nut 14 axially over the threads 34. In a more preferred construction, the slip sheath 22 is either formed substantially from or includes a Teflon™ exterior coating, to facilitate the threaded movement of the nut 14 therealong.

FIG. 11 illustrates a perspective view of a tuned cone bolt 12 which includes two selectively positioned and discrete slip sheaths 22a, 22b. In the embodiment shown, both of the slip sheaths 22a, 22b are provided with a reduced axial length and extend over only a part of the tendon mid-portion 30. It is envisioned that the cone bolt 12 of FIG. 11 would be used where partial adhesion between the resin 18 and sections of the mid-portion 30 of the steel tendon 20 is desired to increase the overall pullout resistance of the bolt 12.

Although the detailed description of the invention describes the mine roof support assembly 10 as including a cone bolt 12, the invention is not so limited. It is to be appreciated that the sheath 22 of the present invention is equally adaptable for use with other types of yieldable and non-yieldable support bolts. These include without restriction conventional rebar, strand bolts, cable bolts, other types of mechanical wedge bolts and the like.

With these embodiments, again following the formation of the tendon, one or more coatings may optionally be sprayed or applied having desired anti-corrosive and/or debonding properties. Following the application of the spray coating, a plastic tube formed from heat shrinkable plastic of the desired length is positioned over the selected portions of the tendon 20 to be encapsulated. Optionally, the tube used to form the sheath 18 may be provided with a colour or other suitable markings or indicia unique to a predetermined tendon pullout strength to be achieved, depending upon the type of strata and site of placement.

While the detailed description describes the sheath 22 as being formed from a heat shrinkable plastic tube or sleeve, the invention is not so limited. It is to be appreciated that slip sheaths 22 formed from a variety of different types of materials could also be used, including without restriction metal sleeves, as well as sleeves made from shrinkable and non-shrinkable rubbers, graphite-carbon composite fibres, other types of plastics and the like.

Although the preferred embodiment describes the bolt 12 as having as a tensioning feature, external threads 34, the invention is not so limited. In an alternate construction, the proximal-most end portion 46 of the bolt 12 could be provided with other threaded or unthreaded mechanical coupling members used to engage a fastener, or otherwise configured to received thereon a push-nut or other friction fastener.

Although the detailed description describes and illustrates various preferred embodiments, the invention is not so limited. Many modifications and variations will now occur to persons skilled in the art. For a definition of the invention, reference may be had to the appended claims.

We claim:

1. A yieldable mine roof support assembly for use in a predrilled bore hole, the assembly comprising:
   a longitudinally extending tendon, said tendon being elongated along an axis and extending from a threaded proximal end portion to a distal portion, and further including a mid-portion intermediate the proximal and distal portions;
   the distal portion including at least one anchor member; and
   at least one slip sheath disposed radially about at least part of said mid-portion,
   a debonding agent interposed between said slip sheath and said mid-portion, the at least one slip sheath comprising a heat shrunk plastic tube mechanically coupled to said tendon and
   being coupled to said mid-portion, to allow axial sliding of said tendon relative to said sheath on the application of a predetermined force sufficient to effect yielding movement of said tendon in said bore hole.

2. The mine roof support assembly as claimed in claim 1, wherein the slip sheath extends in a longitudinal direction at least half the distance between the proximal end portion and the distal portion.

3. The mine roof support assembly as claimed in claim 2, wherein the proximal end portion includes a tensioning feature, the slip sheath extending in the longitudinal direction substantially the distance between the proximal end portion and the distal portion.

4. The mine roof support assembly as claimed in claim 1, wherein said tube comprises a heat shrinkable plastic selected from the group consisting of polyvinyl chloride, polyvinyl acetate, polyethylene terephthalate, neoprene and poly-alpha-olefin.

5. The mine roof support assembly as claimed in claim 1, wherein said debonding agent is selected from the group consisting of a graphite based lubricant coating, a petroleum based lubricant, and a wax.

6. The mine roof support assembly as claimed in claim 5, wherein said debonding agent comprises a heavy oil.

7. The mine roof support assembly as claimed in claim 1, further including an anti-corrosive coating interposed between said slip sheath and said tendon.

8. The mine roof support assembly as claimed in claim 1, wherein said slip sheath has an average radial thickness selected at between 0.5 and 8 mil, preferably about 1 mil.

9. The mine roof support assembly as claimed in claim 1, wherein said tendon comprises a cone bolt, and said anchor member comprises a frustoconical wedge member extending radially outwardly about the axis from a reduced diameter proximal-most end to an enlarged diameter end distally therefrom.

10. The mine roof support assembly as claimed in claim 1, wherein said slip sheath is provided with a colour coding which is correlated to the predetermined force.

11. A yieldable roof support assembly for use in a predrilled bore hole, the assembly comprising:
   an anchor member comprising a longitudinally extending steel tendon, a slip sheath, and a coating,
   said tendon extending along a tendon axis from a threaded proximal end portion to a distal portion, and further including a mid-portion intermediate the proximal and distal portions;
   the distal portion including at least one wedge member having a proximal-most reduced diameter portion and a distal-most enlarged diameter portion;
   the slip sheath disposed radially about said mid-portion, the coating being interposed between said slip sheath and said tendon, the coating selected to provide a debonding property and an anti-corrosive property,
   the slip sheath comprising a heat shrunk plastic tube mechanically coupled to the mid-portion to selectively allow axial sliding of said tendon relative thereto on the application of a predetermined minimum force to effect yielding movement of said tendon in said bore hole; and
   wherein the predetermined minimum force is pre-selected having regard to at least one of the type and extent of said coating along the mid-portion.

12. The roof support assembly as claimed in claim 11, wherein the wedge member includes at least one frustoconical wedge extending radially about the tendon axis, the distal portion further including a tongue member extending generally axially from the enlarged diameter portion, and wherein the slip sheath extends in a longitudinal direction at least half the distance between the proximal end portion and the distal portion.

13. The roof support assembly as claimed in claim 11, wherein the sheath extends in the longitudinal direction substantially the distance between the proximal end portion and the distal portion.

14. The roof support assembly as claimed in claim 11, wherein said plastic tube is formed from a heat shrinkable plastic selected from the group consisting of polyvinyl chloride, polyvinyl acetate, polyethylene terephthalate, neoprene, a tetrafluoroethylene and poly-alpha-olefin.

15. The roof support assembly as claimed in claim 11, wherein said coating comprises a debonding agent selected from the group consisting of a graphite coating, a petroleum based lubricant, a wax and a heavy oil.

16. The roof support assembly as claimed in claim 11, wherein said slip sheath has a pre-selected colour which is correlated to the predetermined minimum force.

17. The roof support assembly as claimed in claim 11, wherein said sheath has an average radial thickness selected at between 0.5 and 5 mil, preferably about 1 to 3 mil.

18. A mine roof support system for use in a predrilled bore hole, the system including in combination:
    an elongated cone bolt;
    a threaded fastener for tensioning said cone bolt; and
    a resin composition for securing said cone bolt at least partially in said bore hole;
    the cone bolt comprising;
    a tendon elongated along a longitudinal axis and extending from a threaded proximal end portion to a distal portion, and further including a mid-portion intermediate the proximal and distal portions;
    the threaded proximal end portion configured for threaded engagement by said threaded fastener;
    the distal portion including at least one frustoconical wedge member extending radially about the axis from a proximal-most reduced diameter portion to a distal-most enlarged diameter portion;
    a plastic slip sheath disposed radially about at least part of said mid-portion and being mechanically coupled thereto, the slip sheath comprising a heat shrunk plastic tube comprising a plastic selected from the group consisting of polyvinyl chloride, polyvinyl acetate, polyethylene terephthalate, neoprene, a tetrafluoroethylene and poly-alpha-olefin, said slip sheath having an average radial thickness selected at between about 0.4 and 20 mil; and
    a coating interposed between said slip sheath and said tendon, the coating selected to provide a debonding property, the coating being maintained substantially in isolation from said resin composition by said slip sheath,
    whereby with said slip sheath engaged by said resin composition, the sheath allowing axial sliding of said tendon relative thereto on yielding movement of said tendon in said bore hole on the application of a predetermined minimum force.

19. The support system as claimed in claim 18, wherein the slip sheath extends in the longitudinal direction substantially at least the distance between the proximal end portion and the distal portion.

20. The support system as claimed in claim 18, wherein said coating further provides an anticorrosive property and is selected from the group consisting of a graphite coating, a grease, an oil, and a wax.

21. The support system as claimed in claim 20, wherein the slip sheath has an average radial thickness selected at between 0.9 and 4 mil.

22. The support as claimed in claim 21, wherein the enlarged diameter portion is selected at least 0.5 cm larger than, and preferably 0.8 to 2 cm larger than a cross-sectional diameter of the slip sheath.

23. The support system as claimed in claim 22, wherein said slip sheath is provided with a colour coding which is correlated to the predetermined minimum force.

24. The support system as claimed in claim 23, wherein the predetermined minimum force is preselected having regard to at least one of the amount and type of said coating.

25. The support system as claimed in claim 24, wherein the slip sheath extends longitudinally substantially the entire length of the tendon.

26. A method of manufacturing the anchor member as claimed in claim 11 by:
    applying said debonding coating to at least the mid-section of the tendon to form a coated mid-section,
    selecting a tube formed of a heat shrinkable plastic sized for sliding placement over at least one of said proximal end portion and said distal end portion;
    positioning said tube over at least a part of said mid-section of said tendon to cover said coating as a slip sheath;
    applying sufficient heat to said tube to shrink said plastic as said sheath with a sufficiently reduced diameter selected to mechanically couple said sheath to said tendon and substantially encapsulate the coated mid-section.

27. The method as claimed in claim 26, wherein said coating is applied by spray coating.

28. The method as claimed in claim 26 further comprising applying said debonding coating to said tendon in an amount selected to allow for sliding movement of the tendon relative to the sheath on the application of the predetermined minimum force.

* * * * *